US 12,442,662 B2

(12) United States Patent
Andersen (10) Patent No.: US 12,442,662 B2
(45) Date of Patent: Oct. 14, 2025

(54) METHOD FOR DETERMINING EVENTS IN A NETWORK

(71) Applicant: Kamstrup A/S, Skanderborg (DK)

(72) Inventor: Kristoffer Andersen, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 0 days.

(21) Appl. No.: 18/546,810

(22) PCT Filed: Mar. 2, 2022

(86) PCT No.: PCT/EP2022/055275
§ 371 (c)(1),
(2) Date: Aug. 17, 2023

(87) PCT Pub. No.: WO2022/200008
PCT Pub. Date: Sep. 29, 2022

(65) Prior Publication Data
US 2024/0302186 A1      Sep. 12, 2024

(30) Foreign Application Priority Data

Mar. 26, 2021      (EP) .................................. 21165257

(51) Int. Cl.
*G01D 4/00* (2006.01)
(52) U.S. Cl.
CPC ......... *G01D 4/004* (2013.01); *G01D 2204/47* (2021.05)

(58) Field of Classification Search
CPC .......... G01D 4/00; G01D 4/002; G01D 4/004; G01D 4/008; G01D 2204/00; G01D 2204/10; G01D 2204/12; G01D 2204/18; G01D 2204/20; G01D 2204/22; G01D 2204/26; G01D 2204/30; G01D 2204/40;
(Continued)

(56) References Cited

U.S. PATENT DOCUMENTS 10,795,382 B2 * 10/2020 Shafiee .................. G05B 17/02
10,809,885 B2 * 10/2020 Herlong, II ....... H02J 13/00034
(Continued)

OTHER PUBLICATIONS

Santosh Pattar et al: "Searching for the IoT Resources: Fundamentals, Requirements, Comprehensive Review, and Future Directions" ,IEEE Communications Surveys & Tutorials, Sep. 1, 2018 (Sep. 1, 2018), pp. 2101-2132, XP055672641, New York DOI: 10.1109/COMST.2018.2825231.

*Primary Examiner* — Franklin D Balseca
(74) *Attorney, Agent, or Firm* — McGlew and Tuttle, P.C.

(57) ABSTRACT

A method for determining events in a network of consumption meters, in which an event is determined by grouping data wherein the event according to consumption meters which have detected this characterizing data. If groups of consumption meters match, this is determined as an event, the grouping being carried out according to the following criteria—temporal coincidence of the event—spatial concordance of the event—consistency of the event type. The spatial concordance is determined by determining and ranking the Euclidean distance of each of a plurality of consumption meters to everyone of the of others of the plurality of consumption meters, and by assigning the n closest consumption meters that have detected this characterizing data to a group of consumption meters.

19 Claims, 3 Drawing Sheets

(58) Field of Classification Search
CPC ........... G01D 2204/43; G01D 2204/45; G01D 2204/47; H04Q 9/00; H04Q 2209/00; H04Q 2209/10; H04Q 2209/30; H04Q 2209/40; H04Q 2209/60; H04Q 2209/70; H04Q 2209/80; H04Q 2209/82; H04Q 2209/823

See application file for complete search history.

(56) References Cited

U.S. PATENT DOCUMENTS

| | | |
|---|---|---|
| 2012/0232915 A1 | 9/2012 | Bromberger |
| 2016/0109491 A1 | 4/2016 | Kann |

* cited by examiner

METHOD FOR DETERMINING EVENTS IN A NETWORK

CROSS REFERENCE TO RELATED APPLICATIONS

This application is a United States National Phase Application of International Application PCT/EP2022/055275, filed Mar. 2, 2022, and claims the benefit of priority under 35 U.S.C. § 119 of European Application EP21165257.3, filed Mar. 26, 2021, the entire contents of which are incorporated herein by reference.

TECHNICAL FIELD

The invention relates to a method for determining events in a network of consumption meters, especially of electric power meters.

TECHNICAL BACKGROUND

In electrical supply networks as they are nowadays used for supplying electric power for households and industry it is a goal to provide electric power with a voltage that is as constant as possible. In practice however there are events which cause deviations. There are locally very limited events and others which concern several consumers. It is always a problem to distinguish these events, especially to distinguish the important from the unimportant events. To cluster these events, there is needed at least information concerning the start time, the duration time, the type of event and the location of the event. This problem is known from U.S. Pat. No. 10,809,885 B2. In this document it is disclosed to use different event reports from different monitoring and reporting systems and to determine those events which are associated to create a composite fault map for an electrical distribution system.

Usually, it is not a problem to check the temporal coincidence of events by checking the start time of the events and the duration or by checking the start time and the stop time. It is further no problem to check the type of an event. In electrical supply networks there are typically three sorts of events which are important to know, which is undervoltage, overvoltage and power outage. However, it may be difficult to determine the location of the events. If consumption meters, especially electrical power meters are used for capturing events it may be a problem to locate those meters which have detected the event. Depending on the density of consumption meters (consumption meters per square km) there may be many meters close to each other or only several meters widely scattered. This depends on whether these meters are arranged in a town or on the country. For example, there might be 20 consumption meters in the same apartment building and many consumption meters closer than 50 meters.

From a power perspective it is not the Euclidean distance between the meters which is relevant. Instead, it is the connectedness along the cables. Meters connected to the same substation or the same radial on the substation experience similar voltages and settings. In order for the algorithm to cluster events that are close together from a power perspective and to avoid clustering events that are far apart and unrelated, it is problematic to use the Euclidean distance between with events.

SUMMARY

This problem is solved by a method for determining events in a network of consumption meters, especially in a network of electrical power meters according to the specification. Further a head end system according to the invention for executing this method is specified.

This method according the invention for determining events in a network of consumption meters works as follows: An event is determined by grouping data which are characterizing the event and which have been detected by the consumption meters. If groups of consumption meters match, this is determined as an event. The grouping is carried out according the criteria:
 a. Temporal coincidence of the event
 b. Spatial concordance of the event
 c. Consistency of the event type.

According the invention the spatial concordance is determined by determining and ranking the Euclidean distance of each of a plurality of consumption meters to everyone of others of the plurality of consumption meters and by assigning the n closest consumption meters that have detected this characterizing data to a group of consumption meters.

The main idea of this invention is not to use the Euclidean distance of the consumption meters to one another but to rank the Euclidean distance of each of a plurality of consumption meters to everyone of the others of this plurality of consumption meters and then to assign the n closest consumption meters that have detected this characterizing data to a group of consumption meters.

This method has the big advantage that it is more or less independent of the Euclidean distance of the consumption meters which means that this method fits with consumption meters which are arranged rather close to one another as this may be in cities and also fits with consumption meters which are distanced rather far from each other as this may be on the countryside. As only the ranking is regarded this is independent of the distance of each other. A further big advantage of this method is that this ranking has to be done only one time, in practice from time to time if consumption meters are added or removed from the network.

Euclidean distance between two consumption meters is the length of a line segment between these two consumption meters. It can be calculated from the Cartesian coordinates of the consumption meters using the Pythagorean theory. In practice this will be the distance of two consumption meters calculated from the GPS data of these consumption meters. This means that differences in altitude are not taken into account.

According to a further embodiment of the invention the third dimension however can be taken into account. This may be relevant in cities with skyscrapers where you find several consumption meters at the same GPS position but in different altitudes.

Advantageously grouping is carried out by first grouping those events which are of the same event type, secondly by those events which match in time and at last by determining the spatial concordance.

It is beneficial to use the rank of distance of the n closest consumption meters which have detected the event for grouping. Preferably this number n is between 20 and 100, especially 50. This number n which is used may depend on the sort of consumption meters. This number can be adapted if necessary.

For the temporal coincidence of the event it is advantageous to split the time into the time of the beginning of the event and into the time of the duration of the event or to the time of the event. It is clear that if you split the time detection you need either the beginning of the event and the end of the event or the beginning of the event and the duration of the event. For the sake of completeness this could also be done by using the duration of the event and the time of the end of the event, of course this does not seem to be very practicable.

The duration of the event can be calculated, it is the time difference between the end of the event and the beginning of the event.

To evaluate if the time of the beginning and/or the time of the end of an event is considered to belong to the same event, these times (of the beginning or of the ends) should not differ more than a time difference limit which preferably is less than 15 seconds. Otherwise, it is quite sure that these events do not belong together.

For the duration of the events to be considered being the same, this duration should not differ by more than a second time difference limit which preferably is less than 30 seconds.

The method according to this invention can be used with consumption meters as water or gas meters, heat meters or the like. Preferably this method however is used with electric power meters as they are installed in every household. With electric power meters it is possible to detect events in the electrical supply network. If events in the electric network shall be determined, the type of event may be undervoltage, overvoltage, deviation in the mains frequency or power outage. Of course, this invention is not limited to this type of events, but these events should normally be detected.

There are limit values for undervoltage, overvoltage and deviation of the mains frequency in the standards which should be kept. Usually, it will be advantageous to determine events which are not in conformity with standards. However, sometimes there are events within the range given by the standards, however at the end of the limit of tolerance. For determining these events it will be advantageous to have an adjustable trigger level of undervoltage, overvoltage and/or deviation of the mains frequency. With this feature special events can be specified which shall be looked for.

It may be sufficient for determining the spatial concordance to rank the Euclidean distances of a plurality of consumption meters to each other or to a group consumption meters to each other. The best and easiest way however will be if the Euclidean distance of each of all consumption meters of the network to everyone of the others of the consumption meters of the network is determined. Then events in the whole network can be determined and if this has been done this ranking of all consumption meters in the network can be used for further determining events in the network without renewing this ranking.

Sometimes it may happen that one or more events are determined by one single consumption meter only. In this case, this single consumption meter should be marked as being defective and replaced by another one. This consumption meter should not be used any longer for determining events in the network.

According to a further development of the invention it may be advantageous if a first time difference limit is used for comparing events reported by the same consumption meter and a second time difference limit is used for comparing events reported from different consumption meters, the second time difference being smaller than the first time difference.

By having two-time difference limits which are different from each other the filter effect can be customized to the situation where reported events come from the same meter and from different meters. For events which come from the same meter a large time difference is accepted, for events which come from different meters only a small time difference is accepted.

The method according to the invention can be extended. Once an event detected by a consumption meter has been added to a group of events, the reported data from the next closest consumption meter is evaluated according the criteria temporal coincidence and consistence of the event type and if the criteria are fulfilled, the event is added to the group of events.

This method automatically enlarges the spatial scope of the search. It checks if the consumption meters next to the ranking also fulfill the criteria.

For determining events in a network, data of consumption meters are transferred to head end systems where these data are collected and evaluated. These head end systems are well-known for receiving data from electric power meters or for receiving data from heat quantity meters. Data are mostly transferred wirelessly to a head end system which is adapted to receive these data. According to this invention such a head end system which is data connected to a plurality of consumption meters is configured to execute this method for determining events in a network of consumption meters, as specified above. It would be advantageous to configure such a head end system to be able to communicate with a consumption meter, for example to adjust the trigger level of the consumption meter. Accordingly the configuration of the head end system and the adjustment of the trigger level of a group of consumption meters will be practicable.

It will be further advantageous to configure the head end system to calculate and rank the Euclidean distance of each of the consumption meters to everyone of the consumption meters connected to this head end system once before determining a plurality of events. Maybe from time to time this ranking will have to be updated if new consumption meters have been added and old consumption meters have been removed or replaced.

Although electric power meters usually have enough energy to send data all the time, it will be advantageous to send the event data at time intervals to the head end system. This will be more important for all meters which are not connected to electricity which are battery powered. Maybe that event data are typically sent in batches every six hours, or once a day.

The Euclidean distances of the meters will be simplest determined by using their GPS data. The ranking of the Euclidean distances need only to be done once at the beginning when using the method/algorithm the first time. The distance ranking only needs to be done again in case there is a change in the numbers of meters or if they are physically moved to other places. This means that time and computational power is saved because there is no need to make the ranking every time new event data comes in. This ranking is very advantageous because it is independent of the real distance between the consumption meters. If These meters are close to one another as this will be the case in the city or if they are more distanced as will be the case in the countryside. This ranking allows to determine the spatial concordance of the event independent of the distance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
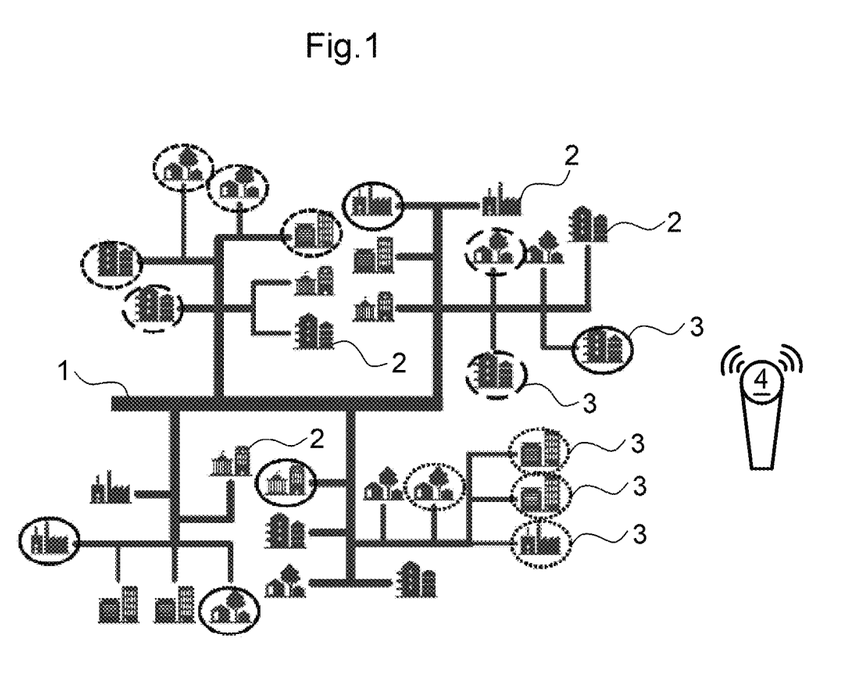
FIG. 1 is a schematic view of an electrical supply network.

Referring to the drawings, in FIG. 1 an electrical supply network 1 is symbolized which shows a plenty of consumers in different houses 2 spread over town and country. Each house comprises at least one electric power meter 5 (not visible in FIG. 1) which is configured to detect electrical events in the network 1. Events are symbolized by circles 3 which are illustrated in solid, dotted, dot-dash-lines, which symbolize different events being detected. These events may differ in time, in type and in location.

These detected events are detected by electric power meters 5. These electric power meters 5 transmit their signals corresponding to the detected events wirelessly to a head end system 4 which is configured to evaluate these signals with the purpose of grouping in order to assign these events spatially, temporally and according to type. As this is an electrical network 1 the events may differ in the event type which may be overvoltage, undervoltage, mains frequency or power outage. The detection level of undervoltage and overvoltage is the same in all meters 5 which are installed in the houses 2. It corresponds to the standards and overvoltage/undervoltage is determined if the voltage deviates from the rated voltage by more than 15%. Undervoltage is determined if the voltage measured in a meter 5 installed in a house 2 is less than 85% of the nominal voltage. For grouping events they must match in type and in time. The time is split into the time of the beginning of an event and into the duration of the event. For the time of beginning there is a tolerance of about 60 seconds, with respect to the duration of the events there is a tolerance of about 120 seconds.

The tolerance in time is evaluated in the head end system 4 as well as the event type. However, the head end system 4 is configured to communicate with the meters 5 not only for receiving data but also for sending data. So the head end system 4 is able to adjust the detection level of undervoltage and overvoltage of a group or of all meters 5 connected to this head end system 4. This can be used to specify grouping for special events.

Figure 3:
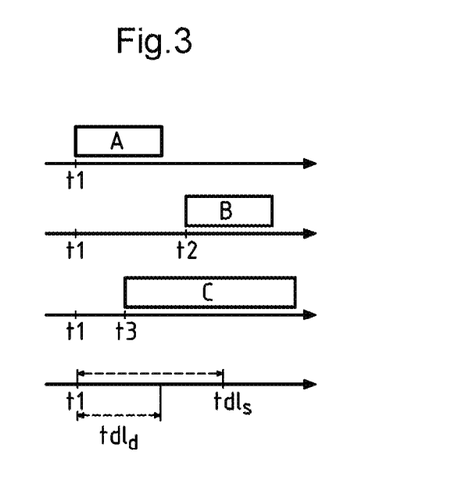
FIG. 3 is a graph showing three events of the same type with the differences in time.

In FIG. 3 it is shown how three events A, B and C of the same type, for example undervoltage events, differ in time. The event A is detected by a first consumption meter starting at the time t1. Another consumption meter detects an event B which starts at t2. As can be seen events A and B have the same duration but different start times t1 and 2. The starting times t1 and t2 are sent by the consumption meters to the head end system which calculates the time difference between t2 and t1. A time difference limit of starting time $tdl_s$ is compared by the head end system to the time difference between t1 and t2 and as this difference is smaller than $tdl_s$, events A and B are grouped which means they are regarded as events which coincide in time. From a third consumption meter the event C of the same type is detected and the starting time t3 and the duration is sent to the head end system. The head end system calculates the difference between the starting times t3 and t1, t2 and t3. The difference is smaller than $tdl_s$. However, the duration of the event C is much longer than the duration of the events A and B (which are the same). The duration of the event C is too long, so the event C is not grouped with the events A and B. The duration of the event C is bigger than the time difference limit of duration $tdl_d$. In practice there are two different time difference limits for an event, a time difference limit $tdl_s$ for the starting time and time difference limit $tdl_d$ for the duration. As there may be time fluctuations in the start time and in the stop time, the value for the time difference limit of the duration is usually bigger than the value for the time difference limit in the start time.

A very important factor for grouping however is the spatial concordance. This is done by ranking the Eucledian distance between one and all other meters. This ranking has to be done for each meter.

In practice the consistency of the event type is first checked, then the temporal coincidence of the event and at last the spatial concordance of the event.

Figures 2A, 2B:
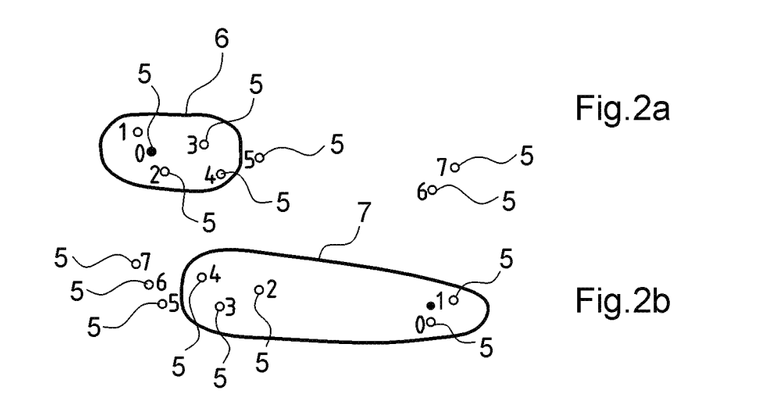
FIG. 2a is a schematic view of a first example for ranking the distance.
FIG. 2b is a schematic view of a second example for ranking the distance with respect to another meter.

In FIG. 2a and FIG. 2b there are symbolized eight meters 5 by small circles arranged at different distances from each other. In FIG. 2a the ranking of distances for the meter which is symbolized as a black circle is done with respect to the other seven meters 5 which are symbolized by circles. As can be seen in FIG. 2a this meter which is symbolized by a black circle has no distance to itself and is ranked to 0, the nearest meter 5 is ranked to 1, the second nearest to 2, the third nearest to 3 and so on up to 7 which has the longest distance to this (black) meter.

This ranking has to be done for each meter 5. In FIG. 2b this is done in the same manner as described in FIG. 2a however this ranking is done with respect to another meter 5 on the right side of this Figure. This meter 5 in FIG. 2b symbolized by the black circle has to be ranked with respect to the other meters 5. The nearest neighbor is ranked with 1 and so on up to the farthest neighbor which is ranked with 7. As shown for two different meters 5 in FIG. 2a and in FIG. 2b this ranking has to be done for every meter 5 installed in the houses 2 belonging to the network 1 in FIG. 1. This ranked distance of each meter can be set up in a distance matrix like the below matrix 1. For simplicity this matrix concerns the distances of only four meters. These meters are numbered with 1, 2, 3, and 4. There is a distance of ten metric meters between the meter no. 1 and the meter no. 2. There is a distance of 15 metric meters between the meter no. 1 and the meter no. 3. There is a distance of 20 metric meters between the meter no. 1 and the meter no. 4. The distance between the meter no. 2 and the meter no. 3 is six metric meters and the distance between the meter no. 3 and the meter no. 4 is seven metric meters.

| Matrix 1: | | | | |
|---|---|---|---|---|
| Meter | 1 | 2 | 3 | 4 |
| 1 | 0 | 10 | 15 | 20 |
| 2 | 10 | 0 | 6 | 12 |

Matrix 1:

| Meter | 1 | 2 | 3 | 4 |
|-------|----|----|---|---|
| 3     | 15 | 6  | 0 | 7 |
| 4     | 20 | 12 | 7 | 0 |

According to the invention this Euclidian distance is replaced by the rank of distance as can be shown in the following matrix 2. A matrix like this has to be created including all meters 5 in the network 1. For determining the spatial concordance of the event this matrix 2 is used and the rank of the distance of the n closest meters 5 which have detected the event is used for grouping. This n is 50 for example and can be varied depending on the type of meters and the network.

Matrix 2:

| Meter | 1 | 2 | 3 | 4 |
|-------|---|---|---|---|
| 1     | 0 | 1 | 2 | 3 |
| 2     | 2 | 0 | 1 | 3 |
| 3     | 3 | 1 | 0 | 2 |
| 4     | 3 | 2 | 1 | 0 |

As can be seen from FIG. 2a and FIG. 2b this ranking is independent from the real Eucledian distances. For example in FIG. 2a, where n is set to five (five meters have to be ranked) the distances of the meters in this area 6 are much smaller than the distances in this area 7 in FIG. 2b having the same ranking.

In practice there can be one million or more consumption meters which have to be ranked. Even if the number of meters is high, by doing this ranking storage space and computing power are comparatively low.

Figure 4:
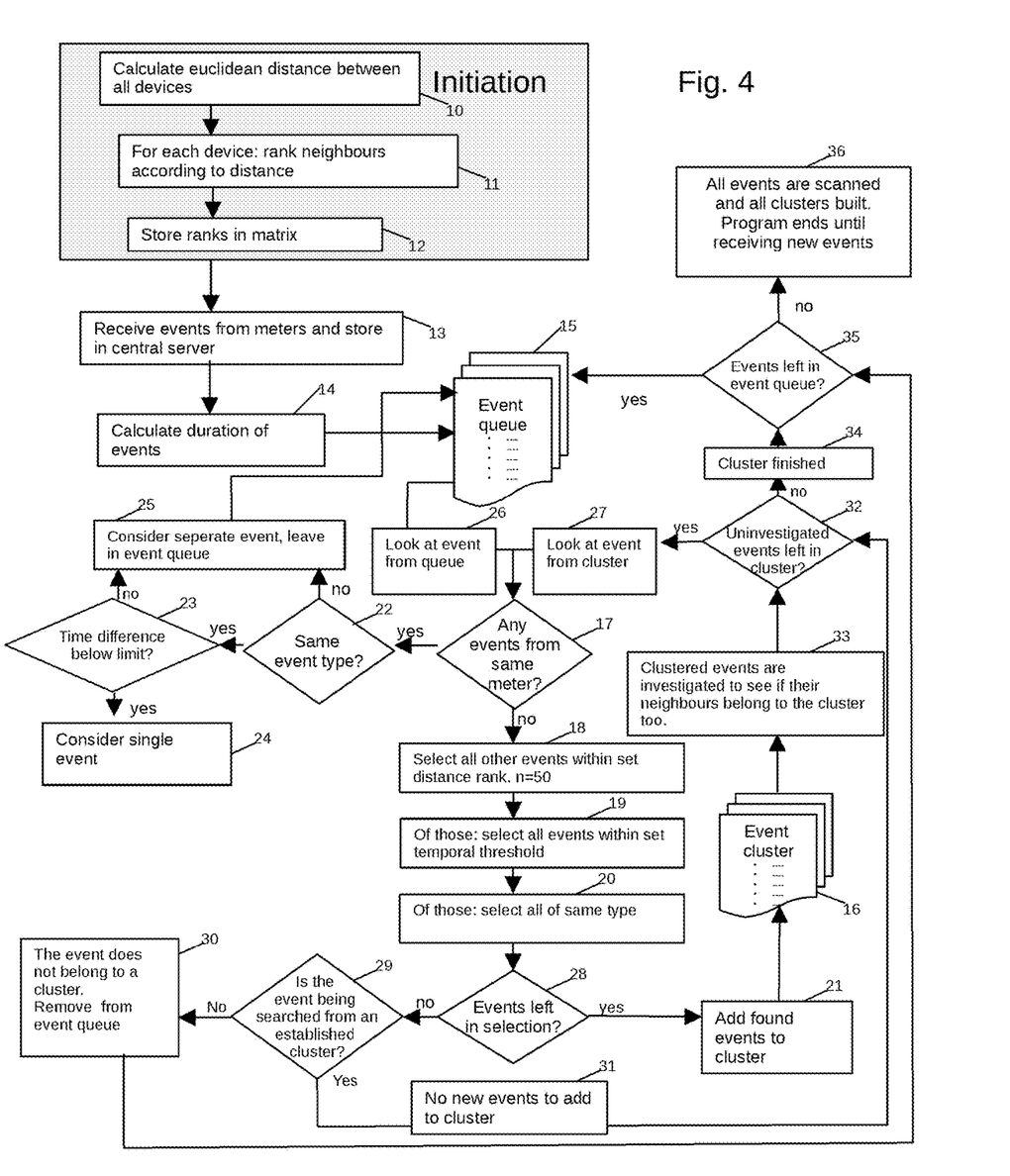
FIG. 4 is a flow process chart concerning the method for determining events in the network.

FIG. 4 shows a flow chart concerning this grouping method. For starting this method for determining events the first step 10 is to determine the Eucledian distance between each of the meters 5 installed in houses 2 connected to the network 1. There may be 100 meters or 1.000 meters or more meters of which the distance to each other has to be determined and ranked to each other. Concerning these electrical power meters 5 the Eucledian distance usually is not known and it is the easiest way to take the address of the house 2 where the meter 5 is installed and to use the GPS data of this address for determining the distances between the meters 5.

After having determined the distances between all meters 5 the distances between these meters 5 have to be ranked in a second step 11. How this is done has been shown above in the example according to FIG. 2a and FIG. 2b and with the ranking matrix 1 and 2.

After having ranked the distances of the meters 5 in the second step 11 this ranking of all meters to each other is stored in the head end system 4 (step 12). The event detection then begins in a step 13 by receiving signals from meters 5 of events which have been detected. These signals are sent to the head end system 4 where they are stored in the central server which may be part of the head end system 4 or which may be distanced from this and where this grouping of events is calculated.

After having received these event data and stored them they have to be evaluated. In this embodiment according to FIG. 4 event data received from the meters and stored in the central server in step 13 are calculated with respect to the duration of the events (step 14). These event data are then stored in an event queue 15 and an identification number is assigned to each (set of) event data including the ID number which identifies the electricity meter. This ID number is fixed already at installation and this ID number is included in the wireless data telegrams when the meter sends data.

Those event data of the event queue 15 are processed one after another starting with a first event data which is ranked to number 1 and which is identified with respect to the type and the time. This event data is stored in an event cluster 16. Then the second event data of the event queue 15 is processed. In step 17 it is checked if this event data comes from the same meter as the first event data or from another meter. If this event comes from a different meter than the first event data in step 18 the distance rank with respect to the first event data is checked. It is further checked in step 19 if this second event data is within the temporal threshold (i.e. time difference limits) with respect to the first event data. At last in step 20 it is checked if those events data are of the same type. If all these three steps 18, 19 and 20 have a positive result, the event data is added to a corresponding cluster 21. If one of these steps 18 to 20 is not positive this event data is added to the event queue 15. This event cluster 16 is the result of grouping of event data and each cluster concerns the same event which has been detected in the network of consumption meters.

So all the events data of the event queue 15 are processed in this manner and grouped into clusters which are arranged in the event cluster 16. This processing of events data compares each event data with each other events data which has been grouped in the event cluster 16. This fact is important with respect to step 18. As each event data is compared with each event data of an event cluster 16, it is not necessary that this rank of distance fits to each event data in an event cluster 16 is has only to fit in this set distance rank of one of the event data in this event cluster 16. This processing creates bigger event clusters and makes sure that all event data which originate from the same event are grouped in the same event cluster.

If an event data is identified as an event from the same meter in step 17, it is further checked if this is the same type of event (step 22) and it is further checked in step 23 if this event data corresponds with respect to the time limits. If both results of step 22 and 23 are positive this event data is considered to be same event data and the meter which has detected these events data is marked as not working correctly. If one or both results of these steps 22 and 23 are negative, the event data is checked in the steps 18, 19, 20 belonging to another cluster in the event cluster 16. These check boxes 18, 19 and 20 are executed for each event data in the event cluster 16. If the event data does not belong to any of the clusters in the event cluster 16, it is removed from the event queue 15.

Further details of this method for determining events in the network are disclosed in the flow process chart according FIG. 4 where these details are described in detail: 24 consider single even, 25 consider separate event, leave in event queue, 26 look at event from queue, 27 look at event from cluster, 28 any events left in selection?, 29 is the event being searched from an established cluster?, 30 the event does not belong to a cluster. Remove from event queue, 31 no new events to add to cluster, 32 uninvestigated events left in cluster?, 33 clustered events are investigated to see if their neighbor belong to the clusters too, 34 cluster finished, 35 events left in event queue?, 36 all events are scanned and all cluster built. Program ends until receiving new events.

While specific embodiments of the invention have been shown and described in detail to illustrate the application of the principles of the invention, it will be understood that the invention may be embodied otherwise without departing from such principles.

LIST OF NUMERALS 1 network
2 houses with meters inside
3 circles
4 head end system
meter
6 area
7 area
tdl time difference limit
$tdl_s$ time difference limit in start time
$tdl_d$ time difference limit in duration
10 first step, calculating
11 second step, ranking
12 step, storing
13 step, receiving event data, storing
14 step, calculating duration
15 event queue
16 cluster queue
17 step, checking where the event comes from
18 step, checking the rank
19 step, checking the time
20 step, checking the type
21 step, add the event to a cluster
22 step, checking type
23 step, checking the time
24 step, consider single event
25 step, consider separate event, leave in event queue
26 step, look at event from queue
27 step, look at event from cluster
28 step, any events left in selection
29 step, is the event being searched from an established cluster
30 step, the event does not belong to a cluster. Remove from event queue
31 step, no new events to add to cluster
32 step, uninvestigated events left in cluster
33 step, clustered events are investigated to see if their neighbor belong to the clusters too
34 step, cluster finished
35 step, events left in event queue
36 step, all events are scanned and all cluster built. Program ends until receiving new events

The invention claimed is:

1. A method for determining events in a network of a plurality of consumption meters, the method comprising steps of:
    determining a first event by grouping data characterizing the first event according to consumption meters of the plurality of consumption meters which have detected the characterizing data and, if data from each consumption meter, that detected the data characterizing the first event, indicates that the first event has occurred, it is determined that the first event has occurred, the grouping being carried out according to a criteria comprising:
    temporal coincidence of the first event,
    spatial concordance of the first event and
    consistency of a type of the first event,
    wherein the spatial concordance is determined by determining and ranking an Euclidean distance of each of the plurality of consumption meters to every other consumption meter of the plurality of consumption meters, and by assigning n closest consumption meters that have acquired the characterizing data to a group of consumption meters.

2. The method according claim 1, wherein the grouping is carried out by first grouping events which are of a same event type, and secondly grouping by those events which match in time and lastly grouping by determining the spatial concordance.

3. The method according claim 1, wherein a rank of distance of the n closest consumption meters which have detected an event is used for grouping and n being between 20 and 100.

4. The method according to claim 1, wherein for temporal coincidence of an event time detection is split into a time of a beginning of the first event and into a time of duration or an end of the first event.

5. The method according to claim 4, wherein the time of the beginning of the first event and the end of the first event are considered to belong to a same event if the time of the beginning of the first event and the end of the first event not differ by more than a time difference limit.

6. The method according claim 5, wherein the time of the beginning and/or the end of the first event is less than 15 seconds.

7. The method according to claim 4, wherein a duration of an event is considered as being the same as the first event if the duration does not differ more than a second time difference limit.

8. The method according to claim 7, wherein the duration of first event is less than 30 seconds.

9. The method according to claim 1, wherein the plurality of consumption meters are electric power meters.

10. The method according to claim 1, wherein for the consistency of the type of the first event is undervoltage, overvoltage, deviation of mains frequency or power outage.

11. The method according to claim 10, wherein a trigger level of undervoltage, overvoltage and/or deviation of the mains frequency is adjustable.

12. The method according to claim 1, wherein the Euclidean distance of each of the plurality of consumption meters to every other consumption meter is determined by using geographical data or address data of the plurality of consumption meters via the internet.

13. The method according to claim 1, wherein if one or more events are determined in one single consumption meter only the one single consumption meter will be marked as being defective.

14. The method according to claim 1, wherein a first time difference limit is used for comparing events reported by a same one of the plurality of consumption meters and a second time difference limit is used for comparing events reported from different consumption meters, the second time difference limit being smaller than the first time difference limit.

15. The method according to claim 1, wherein once the first event detected by a consumption meter has been added to a group of events characterizing data from a next closest consumption meter is evaluated according to the criteria temporal coincidence of the first event and consistence of the type of the first event and if the criteria of the characterizing data of the next closest consumption meter are fulfilled the first event is added to the group of events.

16. The method according claim 1, wherein a rank of distance of n closest consumption meters which have detected an event is used for grouping and n being 50.

17. A head end system which is data connected to a plurality of consumption meters configured to execute a method comprising steps of:

determining a first event by grouping data characterizing the first event according to consumption meters of the plurality of consumption meters which have detected the characterizing data and, if data from each consumption meter, that detected the data characterizing the first event, indicates that the first event has occurred, it is determined that the first event has occurred, the grouping being carried out according to a criteria comprising:

temporal coincidence of the first event, spatial concordance of the first event and consistency of a type of the first event, wherein the spatial concordance is determined by determining and ranking an Euclidean distance of each of the plurality of consumption meters to every other consumption meter of the plurality of consumption meters, and by assigning n closest consumption meters that have acquired the characterizing data to a group of consumption meters.

18. The head end system according claim 17, wherein the head end system is configured to adjust a trigger level of the plurality of consumption meters.

19. The head end system according claim 17, wherein the head end system is configured to calculate and rank the Euclidian distance of each of the plurality of consumption meters to every other consumption meter of the plurality of consumption meters connected to the head end system once before determining a plurality of events and/or from time to time after having determined a plurality of events.

* * * * *